Figure 1:
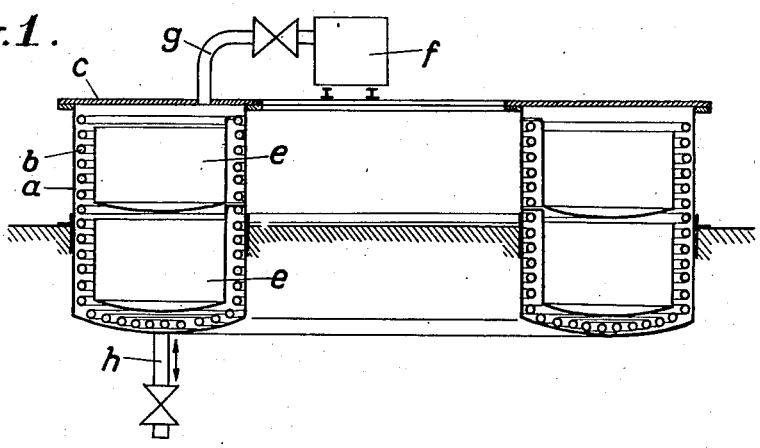

Sept. 1, 1936.  W. NEUHOLD  2,052,938

IMPREGNATING DEVICE

Filed Feb. 1, 1934

Inventor:
W. Neuhold
By Marks & Clerk
Attys.

Patented Sept. 1, 1936

2,052,938

UNITED STATES PATENT OFFICE 2,052,938

IMPREGNATING DEVICE

Walter Neuhold, Berlin-Charlottenburg, Germany, assignor to N. V. Machinerieen-en Apparaten Fabrieken "Meaf", Utrecht, Netherlands Application February 1, 1934, Serial No. 709,395
In Germany March 2, 1933

1 Claim. (Cl. 91—46)

This invention relates to a device for impregnating cables.

For impregnating cables heated hollow vessels are used having the form of an ordinary boiler of the vertical type and provided with a removable cover. These vessels are subjected to a vacuum treatment during impregnation and for this reason must be vacuumproof. Sometimes, the vacuum treatment is followed by a second step involving pressure, and the vessels must therefore be capable of resisting pressure.

The cables to be impregnated are placed in baskets and introduced with the latter into a hollow vessel. As cables can be bent only at a greater radius, only the outer portion of the baskets can be used, and for this reason cable baskets are of annular construction. Cable baskets of this type when inserted in the hollow vessel leave in the center thereof a free space which is filled by an inner central dome which affords also an opportunity of heating the cables from the inside, if it is provided with heating surfaces. For this reason the impregnating vessel and the dome are preferably equipped with double heating jackets or heating coils.

If an outfit of this kind is, as required, completely filled with impregnating mass during the impregnating process, large amounts of this mass will not participate directly in the process. The spaces left vacant by the cable and the baskets and requiring filling are relatively large, and the size of the space for the mass in the impregnating vessel determines also the size of all other apparatus in which the used and soiled mass has to be subjected to preliminary or aftertreatment. Therefore, if the space for the mass in the impregnating vessel can be reduced, all other apparatus of the impregnating outfit can be reduced also as well as the amount of impregnating mass.

It has been proposed already to effect a saving in oil in various ways, but the devices required suffered from serious drawbacks. For example, the cable baskets themselves have been constructed to act as vessels capable of being exposed to pressure and vacuum treatment, the annular baskets being for this purpose hermetically sealed by an annular cover, so that the impregnating vessel itself, which did not contain baskets, acquired annular form. However, since the vessel in this case represents also the basket, it must be transported with the cable, and such annular vessels are quite heavy, as their walls, usually double jackets, and their covers must be made very thick to withstand the vacuum and pressure. The closures between the cover and the vessel are heavy, and powerful cranes are needed to raise and convey the dead load of the annular vessels. Furthermore, the operation of such devices takes much time and great care is needed to render them vacuumproof. The vessel has to be connected at each change of location to pipings for the mass, etc., and packing is a difficult task.

It has further been proposed to render annular mass vessels rotatable so that the cables can directly be placed therein and removed therefrom. Devices of this type interfere, however, with the utilization of the equipment, as the insertion and removal of the cables requires much time during which the impregnating device cannot be used. Furthermore, such a vessel must be arranged in closest proximity to the lead press whereby the full utilization of the impregnating device is restricted.

The invention proposes an impregnating device for cables employing insertable and removable annular cable baskets. The boiler is of annular shape also, and the vessel is tightly closed on top by an annular cover. A device of this kind affords the advantage that oil is saved, which involves a reduction in the dimensions of all accessory apparatus and pipings, and that, in addition, transport devices are restricted to moving the lightly constructed cable baskets with their cables whereby the dead load is reduced to a considerable extent. Since the annular vessel remains stationary, the pipings remain permanently attached thereto like the supply pipes for the mass, for steam and cooling water, and all troubles connected with the frequent removal of the pipings in movable annular vessels are eliminated.

Figure 2:
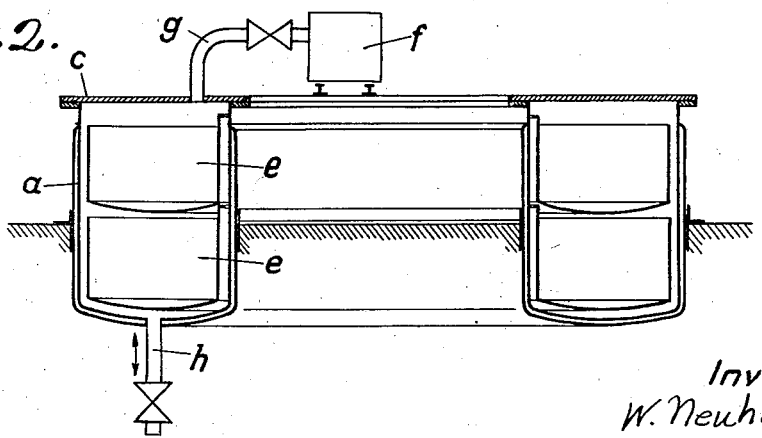

The invention, by way of example, is illustrated in the accompanying drawing, in which:

Fig. 1 is a transverse sectional view partly in elevation of one form of the improved impregnating device according to the invention, Fig. 2 is a similar view of a slightly modified form thereof.

Referring now, more particularly, to the accompanying drawing especially Fig. 1 there is provided an annular vessel $a$ having a connection at its lower end with the supply piping $h$ for the impregnating mass, and a similarly arranged discharged connection. It is possible to use one and the same pipe for supply and discharge. $b$ are heating coils disposed along the walls, or double jackets may serve for heating. The annular cover c carries a pipe g leading to a vacuum pump. When the cable baskets e are completely filled with cables, only a fraction of the amount of mass required for filling the vessels of the type provided with a dome will be needed for the construction shown in Fig. 1.

The heating coils b of the annular vessel of Fig. 1 may be used also as cooling coils if charged with cooling water instead of steam. The cable baskets e are preferably constructed so as to fill as completely as possible the available space.

The arrangement according to Fig. 1 makes it possible to keep the evacuating spaces of the impregnating vessel quite small, so that the evacuating means, e. g., the vacuum pump, may be much smaller than in other devices and disposed directly on the cover of the vessel, as shown at f in Fig. 1. The connecting piping between the space of the annular vessel a to be evacuated and the vacuum pump f is thus reduced to the elbow g, which means a large saving in material and weight and an elimination of sources of trouble, as only a few packing places have to be watched.

The arrangement shown in Fig. 2 is substantially the same as that shown in Fig. 1 with the exception that the walls of the vessel are of the double jacketed type.

In operating the device, the cover c and the vessel a are first disconnected and the cover c lifted off together with the pump f. Then the baskets are lifted out of the impregnating vessel and replaced by newly prepared baskets. As all connections, such as the piping for the mass, the steam and hot water pipings, the cooling water piping, etc., are attached to the annular vessel itself and remain connected thereto, the next operation can be carried out at once. At the greatest possible saving of impregnating mass and attendance, the device permits a quick succession of the steps of the process.

I claim:—

A device for use in impregnating cables and the like, comprising an annular impregnating vessel, annular open cable baskets arranged within said vessel and spaced from the wall and bottom of said vessel, heat transfer means in said vessel occupying said space, an annular cover closing the upper end of said vessel, a pipe connected to the bottom of said vessel for introducing impregnating fluid into and discharging said fluid from said vessel, and a vacuum pump arranged on the annular cover of said vessel and removable therewith and communicating with the interior thereof.

WALTER NEUHOLD.